March 26, 1957 W. J. MURPHY ET AL 2,786,405
ROW MARKER FOR PLANTERS
Filed Jan. 2, 1952 2 Sheets-Sheet 1
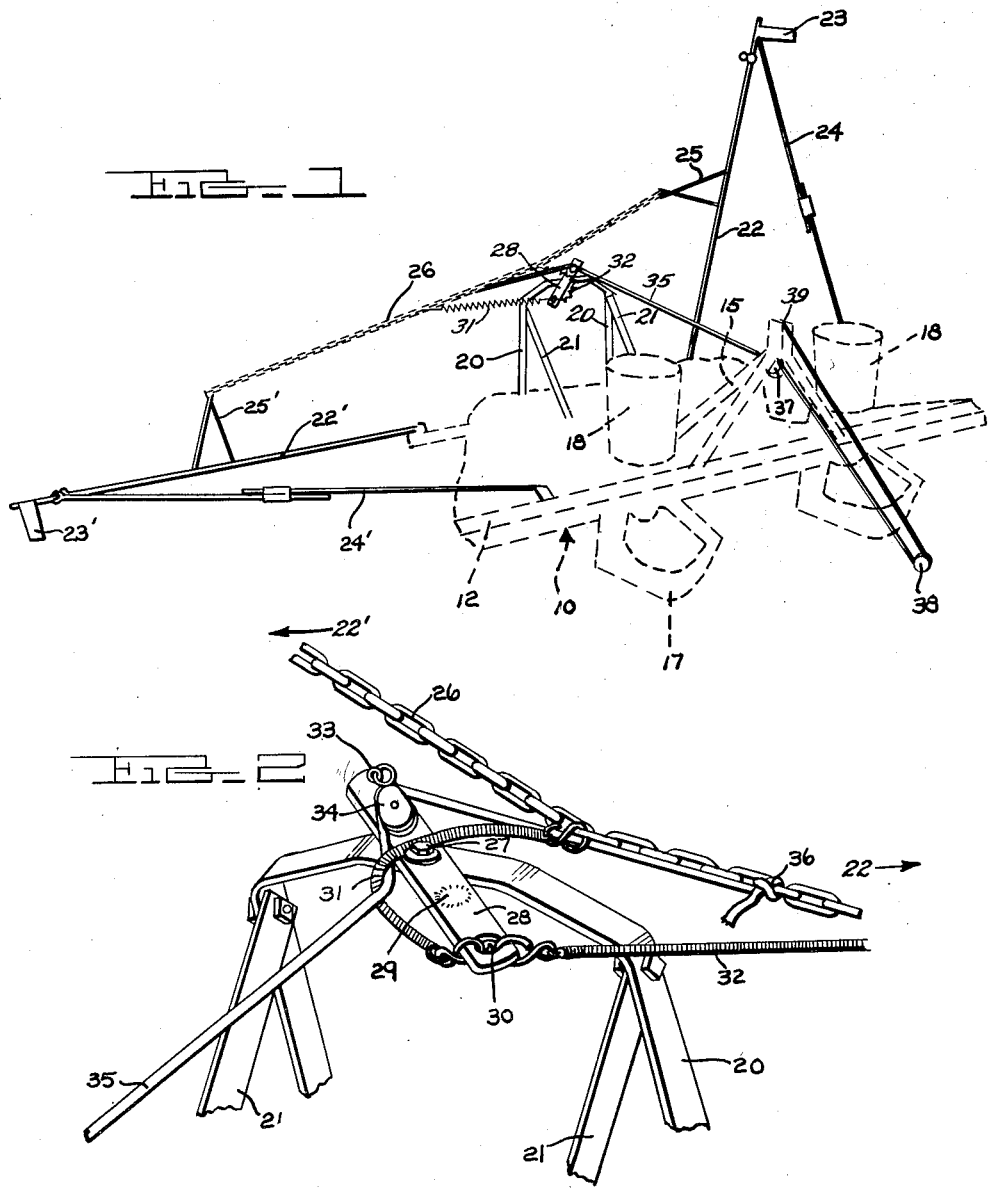
INVENTORS
WILLIAM J. MURPHY
HARRY V. SNOW
JOHN H. ZICH
BY
ATTORNEYS March 26, 1957 W. J. MURPHY ET AL 2,786,405
ROW MARKER FOR PLANTERS
Filed Jan. 2, 1952 2 Sheets-Sheet 2
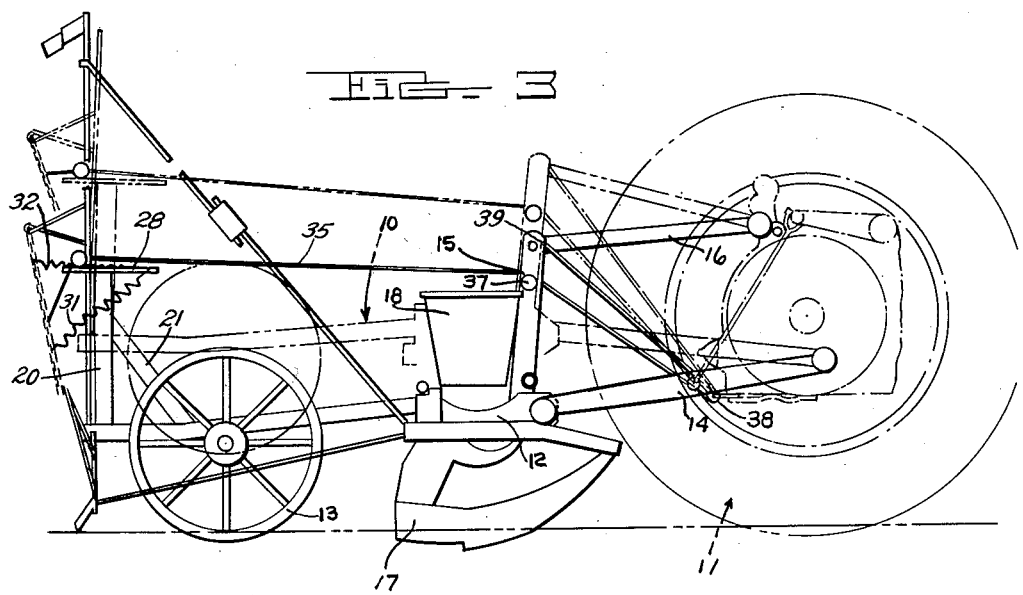
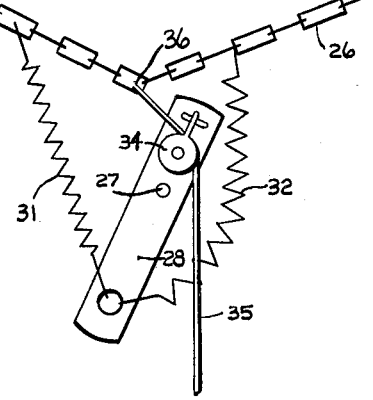
INVENTORS
WILLIAM J. MURPHY
HARRY V. SNOW
JOHN H. ZICH
BY
ATTORNEYS

United States Patent Office 2,786,405
Patented Mar. 26, 1957

2,786,405

ROW MARKER FOR PLANTERS

William J. Murphy, Birmingham, Harry V. Snow, Huntington Woods, and John H. Zich, Detroit, Mich., assignors, by mesne assignments, to Ford Motor Company, Dearborn, Mich., a corporation of Delaware Application January 2, 1952, Serial No. 264,364

4 Claims. (Cl. 97—230)

The present invention relates to a row marker for planters and more particularly to a marker having oppositely directed arms automatically and alternately movable to and from an operative position upon elevation and lowering of a power-liftable planter.

The row marker of the present invention is especially adapted for use with lift-type planters normally disposed on trailing power-liftable tractor draft links of the type utilized in well-known tractors. The lift-type planter is normally elevated by the tractor draft links from its operative ground-engaging position for transport and also at the termination of each planting run across the field during the turn for a succeeding planting run.

The instant marker is well adapted for this type of planting operation, since upon elevation of the planter, as for a turn, both of the marker arms are elevated, while, upon lowering the planter, the proper arm is automatically lowered into marking position. This function is obtained by the provision of counterbalanced laterally extending, oppositely directed marker arms pivoted to the planter and having ground-engaging marker elements adjacent their terminal ends. The counterbalanced arms are joined by a flexible chain or the like of insufficient length to accommodate lowering of both arms to marking positions at one time but sufficient to allow one arm to be lowered to marking position while the other arm is retained in an upright inactive position.

The counterbalanced arms are alternately raised and lowered through a cable or the like connecting the arm-joining means to the planter and trained about a fixed point on the tractor. Elevation of the planter by actuation of the tractor draft links will cause relative tractor-planter movement, and this relative movement is utilized to tension the cable, thereby elevating both of the marker arms. A swingable lever actuated by the cable and resiliently connected to the arm-joining means is employed to condition the arms during elevation for alternate movement to an effective marking position upon subsequent lowering of the planter.

Thus, the present invention affords a marker automatically operable in response to power movement of the planter to elevate the ground-engaging marker elements for transport of the implement and to alternately lower the markers as the planter is lowered to an operative position. The operation of the marker is thus automatic and actually is a consequence of the raising and lowering of the planter with the proper marker being lowered in the desired sequence.

It is, therefore, an important object of the present invention to provide an improved automatic marker for a power-liftable planter whereby ground engagement of the marking elements is controlled by normal lifting and lowering movements of the planter.

It is a further object of the present invention to provide a row marker for power-liftable planters carried by trailing tractor hitch links power-liftable to elevate the planter to an inoperative position, the marker having marking elements automatically moved to an inoperative transport position upon power elevation of the planter and sequentially actuated to marking positions by lowering the planter.

Still another important object is the provision of an improved planter marker including laterally oppositely extending marker arms pivoted to a power-liftable planter and adapted for selective movement to a raised or lowered position as a consequence of elevation and lowering of the planter, the marker arms being elevated and rendered alternately operative by virtue of movement of the planter relative to the tractor during lifting.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a perspective view of a row marker of the present invention as utilized in connection with a lift-type planter shown in dotted outline;

Figure 2 is an enlarged fragmentary perspective view further illustrating the planter marker actuating mechanism;

Figure 3 is a side elevational view of the marker as applied to the planter of Figure 1 and illustrating actuation of the marker upon elevation and lowering of the planter;

Figure 4 is a fragmentary, schematic plan view illustrating the marker actuating mechanism in one of its operated positions; and Figure 5 is a schematic view similar to Figure 4 illustrating the actuating mechanism in another of its operating positions.

As shown on the drawings:

In Figures 1 and 3, reference numeral 10 refers generally to a lift-type planter carried by a tractor 11 and including a rigid frame 12 carrying wheels 13 and adapted for pivoted connection adjacent its forward end to a pair of laterally spaced trailing power-liftable hitch links 14 on the tractor. The links 14 are of the type utilized with well-known tractors and are power-liftable, as by a tractor actuated hydraulic system. The planter 10 is also provided with an upstanding A-frame 15 pivotally connectable at its upper end to a tractor mounted trailing top link 16. The planter is provided with conventional furrow openers 17 mounted forwardly of the wheels 13 for opening a furrow in which the seed from hoppers 18 is deposited.

The planter frame 12 adjacent its rear end is surmounted by a rigid supplementary frame 20 of generally inverted U-shaped configuration braced by forwardly projecting arms 21 also rigidly mounted with respect to the frame 12. The frame 12 also carries a pair of oppositely directed laterally extending marker arms 22 and 22' pivotally connected to the frame and carrying ground-engaging marker elements 23 and 23' adjacent their outer extremities. The arms 22 and 22' are braced by diagonally extending reinforcing arms 24 and 24' also pivotally connected to the frame 12 forwardly of the pivotal connection of the arms 22 and 22'. The arms 22 and 22' are movable relative to the frame in a substantially vertical plane, and the ground-engaging elements 23 and 23' thereof are laterally spaced from the planter 10 through a distance correlated with that spanned by the planter to indicate the path of travel to be followed by the tractor and planter during the next seeding passage across the field being seeded. Since the field is traversed in such a manner that the seeding of adjacent strips is accomplished, it will be appreciated that the ground-engaging elements 23 and 23' will be in alternate engagement with the ground.

The arms 22 and 22' intermediate their length are each provided with a rigid, upstanding, triangularly arranged supporting rod 25 and 25' joined by a flexible joining means, such as the chain 26. The chain 26 is of a length less than that sufficient to accommodate the simultaneous lowering of both arms 22 and 22' to a ground-engaging position, but of a length sufficient to allow one of the arms 22 or 22' to be lowered to an effective position while the other of the arms 22 or 22' is retained in a substantially upright position as illustrated in Figure 1.

The upper bight portion of the frame 20 is provided with a vertically extending pivot bolt 27 upon which is disposed a swingable lever 28 having its medial portion pivoted to the frame 20 by the bolt 27 and having a stop 29 welded to its undersurface for limiting the freedom of movement of the lever about the bolt 27. The arm 28 is apertured adjacent its forward free end, as at 30, for connection to a pair of coiled tension springs 31 and 32, respectively, having their other ends connected to laterally spaced portions of the chain 26. The other end of the lever 28 is provided with an eye bolt or the like 33 pivotally retaining a pulley 34 thereon receiving thereabout the medial portion of a rope or cable 35 having one free end connected, as at 36, to a medial portion of the chain 26 intermediate the connection points of the springs 31 and 32 thereto. The rope 35 extends forwardly from the pulley 34 to be trained about a second pulley 37 mounted on the planter A-frame 15 and then forwardly about a pulley or similar guide surface 38 rigidly mounted on the rear axle of the tractor 11 in spaced relation to the pivot axis of the forward ends of the lower links 14. The free forward terminal end of the rope 35 is anchored as at 39 to the A-frame 15 adjacent the point of connection of the A-frame to the top link 16.

From Figure 3, it will be seen that power elevation of the planter 10, as upon lifting actuation of the lower links 14, will serve to elevate the planter to its dotted position. Simultaneously, the distance of the upper part of the A-frame 15 from the tractor rear axle will be increased, and the distance from the point 38 on the tractor rear axle to the top of the A-frame will be similarly increased to tighten the rope 35 and to exert a forward pulling force thereon. This increase in distance is due to the pivoting of the tractor links 14 and 16 about their forward vertically spaced pivot points. The tensioning of the rope 35 will pull the medial portion of the chain 26 forwardly, as best illustrated in Figure 5 so that the tension on the springs 31 and 32 is relieved.

Thus, the lifting of the planter 10 will elevate both of the marker arms 22 and 22'. In addition to merely elevating the arms 22 and 22', elevation of the planter will cause the lever 28 to swing in a substantially horizontal plane about the vertical pivot bolt 27. This action will be appreciated by a study of Figures 4 and 5 of the drawings. In Figures 2 and 4, marker arm 22 is in lowered marking position, so that the spring 32 is tensioned pulling the forward end of the lever to the right so that the lever is laterally angled with respect to a longitudinal vertical plane through pivot bolt 27. The spring 31 is slack and arm 22' is raised.

As the planter 10 is lifted, the rope 35 is pulled forwardly, pulling the medial portion of the chain 26 toward the left from its position as shown in Figure 4 until the medial chain portion is generally longitudinally aligned with the forwardly extending portion of the rope and both springs 31 and 32 are substantially relaxed. Upon movement of the chain 26 to the left and movement of the medial portion 36 of the chain forwardly as the rope 35 is tensioned, the marker arm 22' is lowered slightly and the marker arm 22 is raised somewhat. The momentum of the ascending and descending marker arms 22 and 22', respectively, carries the medial portion 36 of the chain 26 past center to assume the position shown in Figure 5. Upon the medial portion 36 of the chain passing center, the spring 31 is tensioned and the spring 32 is relaxed, swinging the lever 28 about its pivot bolt 27 to assume the position illustrated in Figure 5. The parts are now positioned so that upon again lowering the planter 10, the marker arm 22' will be lowered to marking position and the marker arm 22 maintained in raised position, the spring 31 being additionally tensioned. Upon again raising the planter 10, the medial portion of the chain 26 is again moved past center as above described but in the opposite direction so as to cause the marker arm 22 to be lowered upon relowering the planter.

As hereinbefore explained, the marker is thus actuated so that the marker arms 22 and 22' are alternately lowered to a marking position upon lowering the planter. Further, upon full elevation of the planter both of the arms are raised with one of the arms being conditioned for lowering upon resumption of the planting operation. The actual elevation of the arms is carried out automatically as a consequence of planter power movement while the selection of the arm to be lowered to an operative position is carried out by the structure illustrated in Figures 4 and 5 and including the swingable lever 28 and the tension springs 31 and 32.

It will, of course, be understood that various details of construction may be varied through a wide range without departing from the principles of this invention and it is, therefore, not the purpose to limit the patent granted hereon otherwise than necessitated by the scope of the appended claims.

We claim:

1. A row marker for a lift-type planter attachable to trailing, power-liftable draft links pivotally mounted at vertically spaced points on a tractor, said marker comprising a pair of oppositely directed arms adapted to be pivotally attached to the planter for vertical movement, a flexible member joining said arms and of such length that at any time only one of said arms can be in lowered marking position while the other of said arms is retained in elevated inoperative position, an actuating cable having one end connected to a medial portion of said flexible member, said cable having a medial portion connectable with said tractor and having its other end connectable to said planter, said one end of the actuating cable being pulled forwardly upon elevation of the planter by said liftable draft links to draw the medial portion of the flexible member forwardly and raise both of said arms to inoperative position, a movable lever pivotally mounted intermediate its ends on an upstanding axis on said implement and laterally swingable about such axis, and resilient means connecting one end of said lever to said flexible member on each side of said cable, the other end of said lever being movable in response to actuation of said cable, whereby power elevation of said planter to raised position will cause elevation of the operative marker arm and momentum of the raised arm will carry the medial portion of the flexible member past said lever and cause pivotal movement of the lever to condition the other arm for lowering to operative position upon relowering the planter.

2. A lift-type planter having a rigid frame attachable to trailing, power-liftable draft links pivotally mounted on vertically spaced points on a tractor for power elevation, the upper portion of said frame being spaced farther from a portion of said tractor when in said raised position than when in said lowered position, a pair of oppositely directed marker arms pivotally attached to said frame for vertical movement, a flexible member joining said arms and of such length that at any time only one of said arms can be in lowered marking position while the other of said arms is retained in elevated inoperative position, an actuating cable having one of its ends connected to a medial portion of said flexible member, said cable having a medial portion connectable to said tractor and having its other end secured to said frame whereby the flexible-member-attached end of the cable is pulled forwardly to draw the medial portion of the flexible member forwardly and raise said marker arms to an elevated position upon lifting of the planter, and means for alternately lowering first one and then the other of said marker arms as said planter is lowered from said elevated position, said means including a lever pivotally mounted intermediate its ends on an upstanding axis on said frame and laterally swingable about such axis, said lever having its one end resiliently connected to said flexible member on both sides of the connection of said cable to said member, said lever being pivoted so that said one end is moved toward one of said marker arms upon elevation of the planter, resilient means connected to the corresponding side of said flexible member being tensioned and tension in the other tension member being released, whereby the opposite marker arm is lowered upon subsequent lowering of the planter.

3. For use with a tractor having vertically spaced upper and lower trailing draft links, at least one of which is power-liftable, an implement comprising a rigid frame connectable at vertically spaced points to said links for vertical movement from a lowered operative position to a raised transport position, the upper portion of said frame being spaced farther from a portion of said tractor when in said raised position than when in said lowered position, and a row marker for said implement, said marker comprising a pair of opposed marker arms pivotally mounted on said implement to project laterally therebyond, a flexible connector joining said arms and of such length that only one of said arms can be in lowered marking position at any given time, the other of said arms being retained in elevated inoperative position, an actuating cable having one end connected to a medial portion of said connector, said cable having a medial portion trained about a pulley connected to said portion of said tractor and having its other end connected to said frame, said first end of said cable being moved upon elevation of said implement to pull the medial portion of said connector forwardly and elevate both of said marker arms, a movable lever medially pivoted to said implement, the first end of said lever being resiliently connected to said flexible connector on both sides of the medial portion of said connector, and having its other end slidably connected with said cable, whereby movement of the medial portion of the flexible connector past the lever effects pivotal movement of said lever upon raising of the lowered one of said arms, said pivotal movement of said lever effecting a conditioning of said resilient means to cause the other of said arms to be lowered upon subsequent lowering of said implement.

4. For use with a tractor having vertically spaced upper and lower trailing draft links, at least one of which is power liftable, an implement comprising a rigid frame connectable at vertically spaced points to said links for vertical movement from a lowered operative position to a raised transport position, the upper portion of said frame being spaced farther from said tractor when in said raised position than when in said lowered position, and a row marker comprising a pair of opposed marker arms pivotally mounted on said frame to project laterally therebeyond, a flexible connector joining said arms and of such length that at any time only one of said arms can be in lowered marking position while the other of said arms is retained in elevated inoperative position, a lever pivotally mounted intermediate its ends on an upstanding axis on said frame and laterally swingable about said axis, an actuating cable having one end connected to a medial portion of said connector, said cable having a medial portion trained about one end of said lever and having its other end adapted to be extended forwardly and connected to said tractor, and tension springs joining the other end of said lever to said connector on either side of said cable, said one end of said cable being moved forwardly upon movement of said frame to raised position to pull the medial portion of said connector laterally and forwardly; thereby elevating the lowered one of said arms and concomitantly moving the medial portion of said connector past the lever, whereby the spring connected to the corresponding side of said flexible connector is tensioned and tension in the other spring is released to swing said lever and condition the other arm for movement to lowered position upon relowering the implement to operative position.

References Cited in the file of this patent
UNITED STATES PATENTS

| | | |
|---|---|---|
| 763,342 | Doak | June 21, 1904 |
| 801,962 | Barnett et al. | Oct. 17, 1905 |
| 2,371,037 | Englund | Mar. 6, 1945 |
| 2,376,464 | White | May 22, 1945 |
| 2,401,837 | Mellen et al. | June 11, 1946 |
| 2,584,200 | Hand et al. | Feb. 5, 1952 |
| 2,604,027 | Hansen | July 22, 1952 |
| 2,618,214 | Ball | Nov. 18, 1952 |

FOREIGN PATENTS

| | | |
|---|---|---|
| 624,707 | Great Britain | June 15, 1949 |